May 15, 1951
C. E. O'MARA ET AL
2,552,578
BOMB CHOCK
Filed Jan. 4, 1950
3 Sheets-Sheet 1
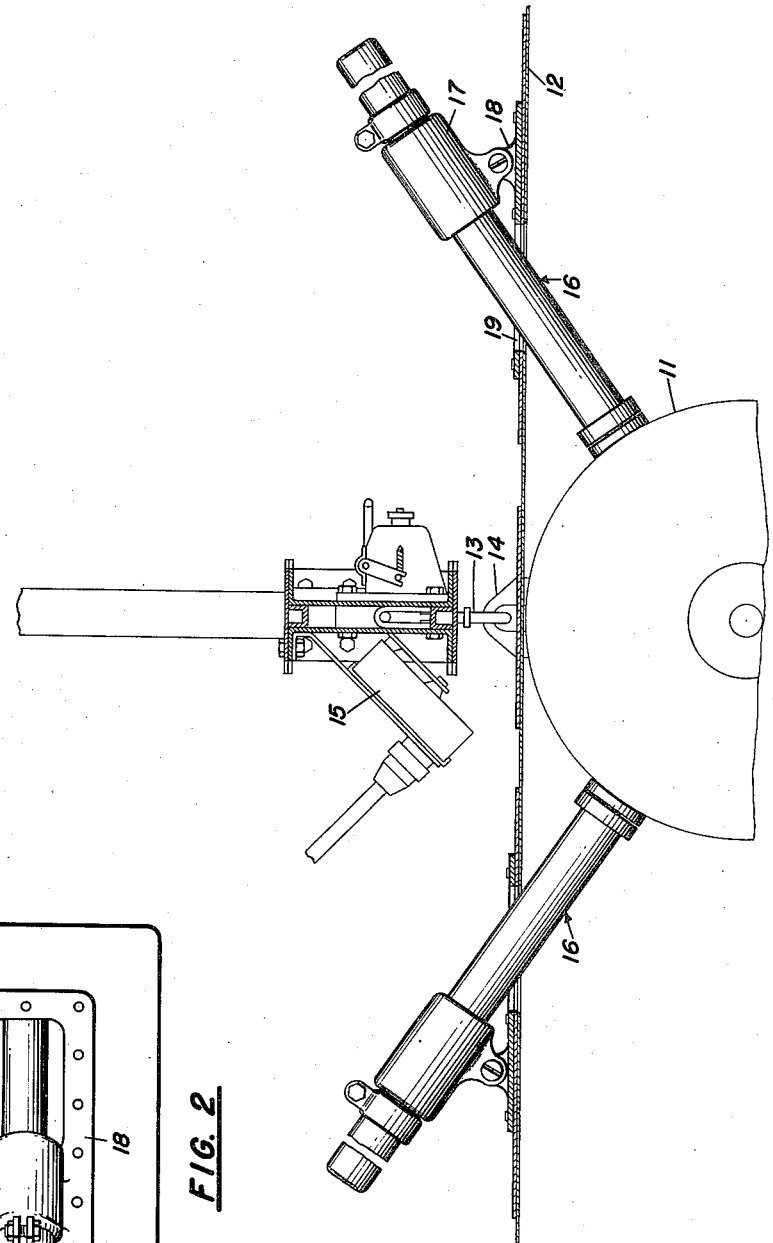
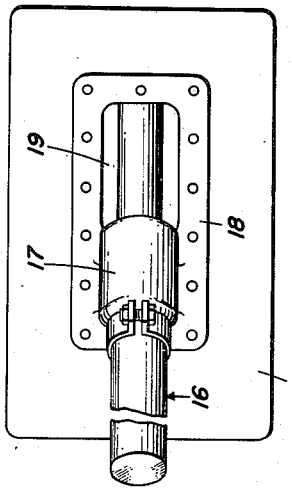
Inventors
CARL E. O'MARA
WALTER L. JOTTER May 15, 1951  C. E. O'MARA ET AL  2,552,578
BOMB CHOCK Filed Jan. 4, 1950  3 Sheets-Sheet 2

Inventors
CARL E. O'MARA
WALTER L. JOTTER

By
Attorney

Inventors
CARL E. O'MARA
WALTER L. JOTTER

Patented May 15, 1951

2,552,578

UNITED STATES PATENT OFFICE 2,552,578

BOMB CHOCK

Carl E. O'Mara, Alexandria, Va., and Walter L. Jotter, Cincinnati, Ohio

Application January 4, 1950, Serial No. 136,782

10 Claims. (Cl. 89—1.5)

(Granted under the act of March 3, 1883, as amended April 30, 1928; 370 O. G. 757)

The present invention relates to a bomb chocking device, and more particularly to a bomb chocking device of the retractable type to be carried by aircraft or the like.

It is the general practice to support the bombs by racks or shackles under the wings of aircraft thereby necessitating the provision of some means for eliminating side-sway during flight, the means usually employed being a separate device, described as a chock, sway brace, or crutch-pad, fastened to the wing skin. The bomb is prevented from swaying by having the device press firmly against the upper surfaces of the bomb preferably at four places, two near the front lug and two near the rear lug. After the bomb is released the device generally remains fixed thereby still projecting from the streamlined contour of the aircraft and producing considerable drag.

It is therefore highly desirable that all such projecting parts which produce drag be withdrawn within the streamlined contour, or in some manner that the streamlined contour be restored, following the release of the bombs. It is also desirable that the chocking device be designed to offer a minimum of drag during the period that it supports the bomb.

An object of the present invention is the provision of a retractable bomb chock for an aircraft.

Another object is to provide a bomb chock for an aircraft which is retractable out of the airstream upon release of the bomb.

A further object of the invention is the provision of a retractable bomb chock operable independently of all others, so that if only a portion of the bombs are released the corresponding chocks will be retracted.

Still another object is the provision of a retractable bomb chock for an aircraft which is individually adjustable thereby obtaining better support for each bomb.

The exact nature of this invention as well as other objects and advantages thereof will be readily apparent from consideration of the following specification relating to the annexed drawing in which:

Fig. 1 is a front elevation of a bomb rack and chocking device of the invention, shown in conjunction with the bomb load of an aircraft.

Fig. 2 is a plan view of the chocking device shown in Fig. 1 and its support on the aircraft.

Figure 3:
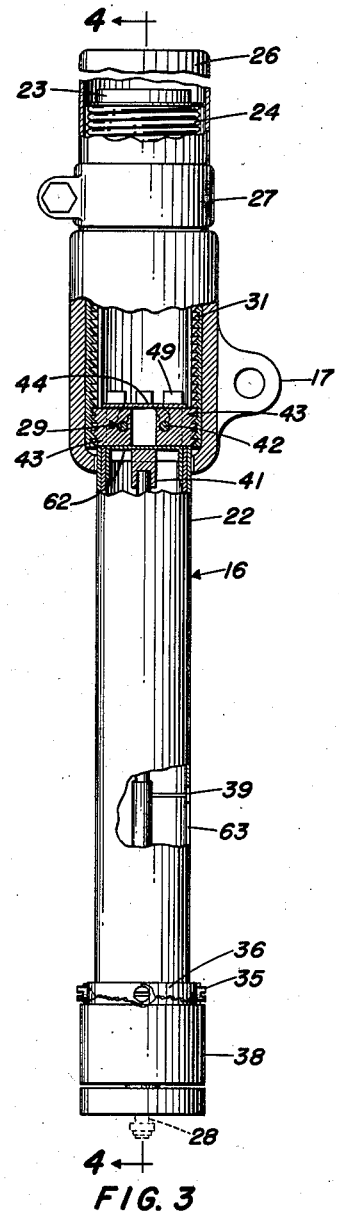
Fig. 3 is a front elevation, partly broken away, of the chocking device of Fig. 1.

Referring now to the drawings, wherein like reference characters designate like or corresponding parts throughout the several views, there is shown in Fig. 1 which illustrates a preferred embodiment, a bomb 11 supported below the wing 12 of an aircraft by means of a conventional bomb shackle 13 mounted in the aircraft and a lug 14 on the bomb, the shackle 13 being controlled by a release mechanism 15 in a conventional manner.

To prevent the bomb 11 from swaying there is employed a plurality of chocks 16, there being preferably four for each bomb, two near the front lug and two near the rear lug. Each chock 16 is supported at a suitable point in the wing by means of a support clevis 17 on the chock and a supporting bracket 18 in the wing. The chock in its supporting position extends through an opening 19 in the lower portion of wing 12.

Figure 4:
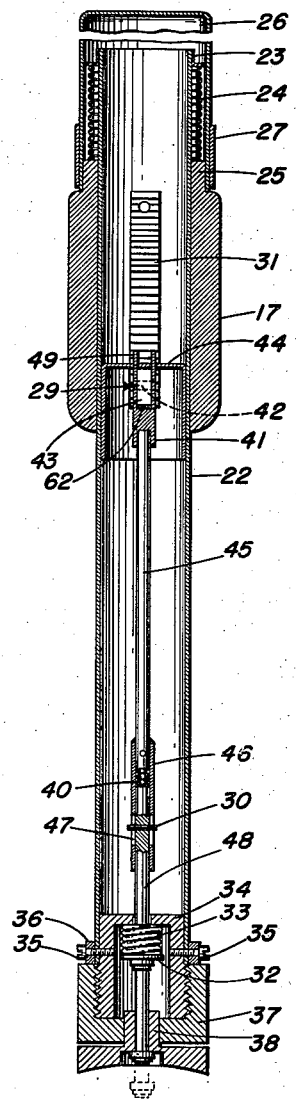
Fig. 4 shows a section of the device taken on the line 4—4 of Fig. 3 looking in the direction of the arrows.

Referring now to Figs. 3 and 4, chock 16 comprises a tube 22 movably mounted in supporting clevis 17 and having an end plate 23 secured at the top thereof, plate 23 serving as a support for one end of a retracting spring 24, the other end of which rests upon abutment 25 at the upper end of clevis 17. Secured to the upper end of clevis 17 around abutment 25 extending upwardly therefrom is a dust cap 26 which encircles spring 24 and the upper end of tube 22. Dust cap 26 is held in place on abutment 25 by means of clamp 27, the cap being of sufficient length to permit tube 22 to retract therein to the extent necessary to draw the chock 16 into wing 12 and out of the airstream.

Axially mounted in tube 16 is a trigger rod 28 having a locking bolt 29 secured at the upper end thereof, bolt 29 cooperating with a locking rack 31 mounted on the clevis 17. Rod 28 is threaded at its lower end to adjustably support a plate 32, there being a helical spring 33 interposed between plate 32 and a block 34 mounted in the lower end of tube 22 by means of screws 35 or the like and collar 36. Adjustably threaded on block 34 is a pad 37 having a bearing 38 axially disposed therein for supporting the lower end of rod 28.

Bolt 29, as seen in Figs. 3 and 4, comprises a pair of cam plates 49 fixed to support 41 welded, or otherwise secured, to rod 28, plates 49 being guided in slots in a transverse member 44 secured in the upper end of tube 22. Each cam plate 49 has corresponding cam slots therein, in which pins 42, supporting toothed members 43, are slidingly engaged for cooperation therewith, members 43 being slidable laterally within the housing formed between the plates 49, the member 44 and a transverse bracket 62, extending across the tube 22. As shown in Figs. 3 and 4, when rod 28 is depressed inwardly of tube 22, and spring 40 is extended to resiliently lengthen the rod 28 by taking up the lost motion between its two portions 45 and 48, pins 42 rest in the lower portion of the cam slots thereby effecting a locking action between members 43 and rack 31. When rod 28 is released and moves outwardly in response to expansion of spring 33, cam plates 49 are carried therewith, thereby positioning pins 42 in the upper portion of the cam slots and causing members 43 to be moved inwardly, whereby releasing action results.

As shown in Fig. 4, trigger rod 28 comprises an upper portion 45 carrying support 41 at its upper end and a hollow sleeve 46 at its lower end, sleeve 46 being slotted intermediate its ends as shown at 47. Rod 28 further comprises a lower portion 48 having a pin 30 at the upper end thereof, portion 48 being slidable within sleeve 46, while pin 30 is slidable in the slotted portion 47 of sleeve 46. Supported within sleeve 46 between the lower end of portion 45 and the upper end of portion 48 is a coiled spring 40.

In operation, tube 22 is pulled out until bearing 38 rests firmly against the upper surface of the bomb as shown in Fig. 1, trigger rod 28 thereby being depressed into tube 22. As portion 48 of rod 28 is depressed and tube 22 is extended, spring 40 is placed under compression until pin 30 reaches the upper end of slotted portion 47 of sleeve 46, any further depression of portion 48 resulting in upward movement of portion 45 and, therefore, support 41 and cam plates 49. When portion 48 is fully depressed, cam plates 49 have reached such a position that pins 42 are in the outermost ends of the cam slots and toothed members 43 are in engagement with rack 31. Locking action between members 43 and rack 31 occurs upon the expansion of spring 46 which forces portion 45 of rod 28 upwardly until pins 42 rest in the lowermost portion of the cam slots in plates 49.

Indicator means 39 mounted on sleeve 46 and visible through slot 63 in tube 22, as shown in Fig. 3, is preferably provided in order that the locking position of rack 31 and members 43 may be readily apparent. Thus, as shown in Fig. 3, when pins 42 are in the lowermost portions of the cam slots of cam plates 49, means 39 will be at the uppermost end of slot 63.

Any further adjustment of pad 37 is obtained by turning pad 37 about block 34, the resultant movement outwardly of portion 48 of rod 28 being taken up by further extension of spring 40 without any retractive movement of portion 45 of rod 28.

When the bomb is dropped the pressure against trigger rod 28 is released, causing the rod to be projected downwardly under the action of spring 33 thereby releasing bolt 29 and withdrawing the toothed members 43 from racks 31. When this unlocking occurs retracting spring 24 expands and draws tube 22 up into the dust cap, thereby drawing chock 16 into the wing 12 and out of the airstream.

Figure 5:
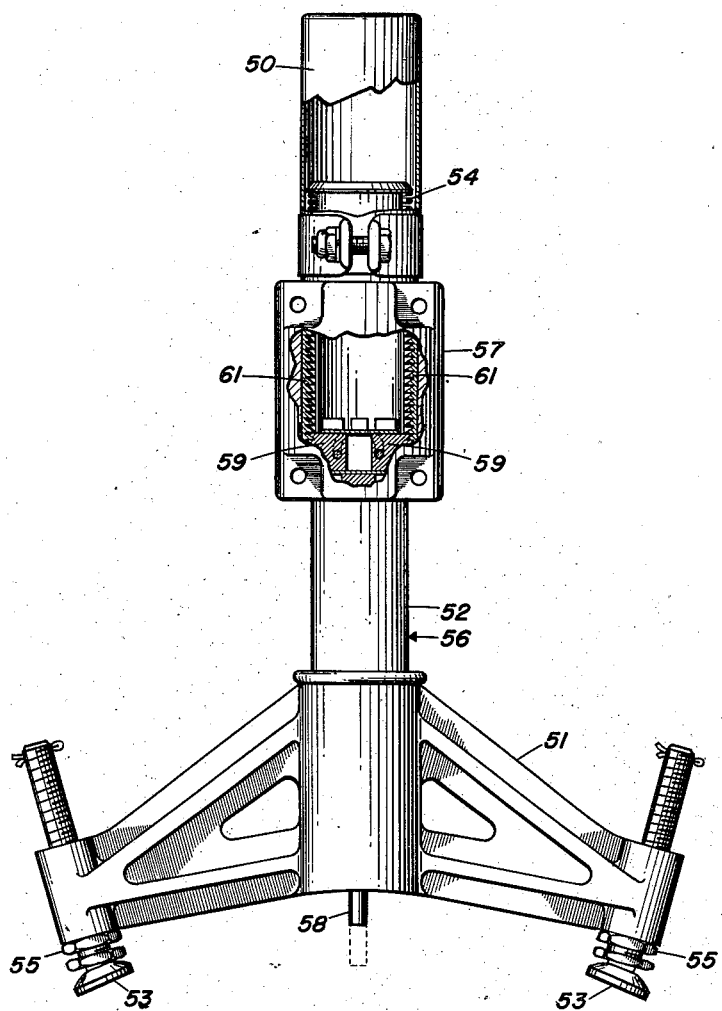
Fig. 5 illustrates a front elevation, partly broken away, of a modification of the bomb chocking device.

Referring now to Fig. 5 there is shown a modified chock 56 comprising a tube 52 mounted on a support 57, a retracting spring 54, a dust cap 50, a trigger rod 58, a locking bolt 59, and a locking rack 61. In chock 56, use is made of the same principles of retraction and locking as in chock 16, but the contact on the bomb surface is effected by means of a yoke 51 carried by tube 52, there being a pad 53 adjustably screw-threaded in each end of the yoke 51 and provided with a lock nut 55. To secure a bomb with this chock, yoke 51 is pulled down against the bomb until rod 58 is depressed sufficiently to lock bolt 59 and rack 61, pads 53 then being adjusted to more securely hold the bomb and then locked by nuts 55.

It should be understood, of course, that the foregoing disclosure relates to only preferred embodiments of the invention and that numerous modifications and alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. In combination with an aircraft having a bomb releasably supported thereon, a pair of telescopic members, the outer of said members being supported in said aircraft and the inner of said members extensible through an opening in said aircraft for engagement with said bomb, releasable locking means for maintaining said inner member in extended position when said inner member engages said bomb, means for retracting said inner member upon disengagement of said bomb therefrom, and trigger means actuable upon bomb release for releasing said locking means and actuating said retracting means.

2. In combination with an aircraft having a bomb releasably supported thereon, a pair of telescopic members, one of said members being supported in said aircraft and the other of said members extensible through an opening in said aircraft for engagement with said bomb, releasable lock means for maintaining said extensible member in extended position, said means being operable upon engagement of said extensible member with said bomb, and resilient means actuated with said lock means for retracting said extensible member upon disengagement of said bomb therefrom.

3. The combination according to claim 2, wherein said lock means comprises a locking bolt mounted on one of said members and a cooperating rack mounted on the other of said members.

4. A bomb chock for an aircraft having a bomb releasably supported thereon, said chock comprising a support mounted in said aircraft, a member slidably mounted in said support and adapted at one end thereof to engage the surface of said bomb, releasable lock means for maintaining said member in extended position, means movable on said member for actuating said lock means between locked and unlocked positions, trigger means incorporated in the bomb-engaging end of said member constructed and arranged to be inoperative while a bomb is engaged thereon and operative upon bomb release to move said lock actuating means to unlocking position, and resilient means operable upon release of said lock means to retract said member.

5. A bomb chock according to claim 4, wherein said lock actuating means comprises a spring-loaded rod slidably mounted in said member.

6. A bomb chock according to claim 4, and an adjustable contacting pad mounted on the end of said member.

7. A bomb chock for an aircraft having a bomb releasably supported thereon comprising a support mounted in said aircraft, a tubular member slidably mounted in said support and having one end adapted to engage the surface of said bomb, a spring-loaded rod slidably mounted in said member and normally extending outwardly from said bomb-engaging end of said member for similar engagement with the surface of said bomb, lock means actuated by the engagement of said rod with the surface of said bomb for maintaining said member in extended position in engagement of said end with said bomb, and resilient means operable upon disengagement of said rod and release of said lock means for retracting said member.

8. A bomb chock for an aircraft having releasable bomb holding means comprising a support mounted in said aircraft, a chock member movably mounted on said support and biased to be normally retracted in said aircraft, locking means between said support and said chock member adapted to releasably secure said chock member in extended position exterior of said aircraft to brace a bomb held thereon, and trigger means on said chock member normally held inoperative by the bomb while so braced and operative by bomb release to unlock said locking means.

9. The device as set forth in claim 8 in which said chock member is tubular and is slidably mounted in said support.

10. The device as set forth in claim 9 in which said trigger means includes a rod biased to project from said chock member at the point where the bomb is braced and adapted to be held in cocked position by the braced bomb.

CARL E. O'MARA.
WALTER L. JOTTER.

REFERENCES CITED

The following references are of record in the file of this patent:

UNITED STATES PATENTS

| Number | Name | Date |
|---|---|---|
| 1,367,456 | Browen | Feb. 1, 1921 |